United States Patent
Can et al.

(10) Patent No.: US 10,472,288 B2
(45) Date of Patent: Nov. 12, 2019

(54) CUBIC BORON NITRIDE COMPOSITE MATERIAL, METHOD OF USING IT, METHOD OF MAKING IT AND TOOL COMPRISING IT

(71) Applicant: Element Six (UK) Limited, Oxfordshire (GB)

(72) Inventors: Antionette Can, Oxfordshire (GB); Anne Myriam Megne Motchelaho, Oxfordshire (GB); Mehmet Serdar Ozbayraktar, Oxfordshire (GB)

(73) Assignee: ELEMENT SIX ABRASIVES S.A., Luxembourg (LU)

( * ) Notice: Subject to any disclaimer, the term of this patent is extended or adjusted under 35 U.S.C. 154(b) by 222 days.

(21) Appl. No.: 15/324,171

(22) PCT Filed: Jul. 6, 2015

(86) PCT No.: PCT/EP2015/065397
§ 371 (c)(1),
(2) Date: Jan. 5, 2017

(87) PCT Pub. No.: WO2016/005342
PCT Pub. Date: Jan. 14, 2016

(65) Prior Publication Data
US 2017/0158566 A1    Jun. 8, 2017

(30) Foreign Application Priority Data
Jul. 8, 2014    (GB) .................................. 1412164.4

(51) Int. Cl.
| | | |
|---|---|---|
| *C04B 35/5831* | (2006.01) | |
| *C04B 35/65* | (2006.01) | |
| *B23B 27/14* | (2006.01) | |
| *C04B 35/626* | (2006.01) | |
| *C04B 35/63* | (2006.01) | |
| *C04B 35/645* | (2006.01) | |
| *C22C 26/00* | (2006.01) | |
| *B22F 5/00* | (2006.01) | |

(52) U.S. Cl.
CPC ...... *C04B 35/5831* (2013.01); *C04B 35/6261* (2013.01); *C04B 35/6262* (2013.01); *C04B 35/62635* (2013.01); *C04B 35/6316* (2013.01); *C04B 35/645* (2013.01); *C04B 35/65* (2013.01); *C22C 26/00* (2013.01); *B22F 2005/001* (2013.01); *B22F 2998/10* (2013.01); *C04B 2235/386* (2013.01); *C04B 2235/3813* (2013.01); *C04B 2235/3873* (2013.01); *C04B 2235/3886* (2013.01); *C04B 2235/3891* (2013.01); *C04B 2235/404* (2013.01); *C04B 2235/428* (2013.01); *C04B 2235/5436* (2013.01); *C04B 2235/612* (2013.01); *C04B 2235/762* (2013.01); *C04B 2235/785* (2013.01); *C04B 2235/786* (2013.01); *C04B 2235/80* (2013.01); *C04B 2235/85* (2013.01)

(58) Field of Classification Search
CPC ......................... C04B 35/5831; B23B 27/148
See application file for complete search history.

(56) References Cited

U.S. PATENT DOCUMENTS

| | | |
|---|---|---|
| 2,854,736 A | 10/1958 | Taylor |
| 5,288,297 A | 2/1994 | Ringwood |
| 8,419,814 B2 | 4/2013 | Can et al. |

FOREIGN PATENT DOCUMENTS

| | | |
|---|---|---|
| EP | 0839776 A2 | 5/1998 |
| GB | 1593770 A | 7/1981 |
| JP | H06219841 A | 8/1994 |
| JP | 2009513471 A | 4/2009 |
| PL | 402209 A1 | 7/2014 |
| WO | 199118844 A1 | 12/1991 |
| WO | 199217618 A1 | 10/1992 |
| WO | 2007049140 | 5/2007 |

OTHER PUBLICATIONS

Search Report for PCT/EP2015/065397 dated Oct. 2, 2015.
Search Report for GB1511808.6 dated Jan. 21, 2016.

*Primary Examiner* — Karl E Group
(74) *Attorney, Agent, or Firm* — Bryan Cave Leighton Paisner LLP

(57) ABSTRACT

A composite material and a method of using the composite material. The composite material consists of at least 65 volume percent cubic boron nitride (cBN) grains dispersed in a binder matrix, the binder matrix comprising a plurality of microstructures bonded to the cBN grains and a plurality of intermediate regions between the cBN grains; the microstructures comprising nitride or boron compound of a metal; and the intermediate regions including a silicide phase containing the metal chemically bonded with silicon; in which the content of the silicide phase is 2 to 6 weight percent of the composite material, and in which the cBN grains have a mean size of 0.2 to 20 μm.

13 Claims, 4 Drawing Sheets

US 10,472,288 B2

CUBIC BORON NITRIDE COMPOSITE MATERIAL, METHOD OF USING IT, METHOD OF MAKING IT AND TOOL COMPRISING IT

FIELD OF THE INVENTION

This disclosure relates generally to composite material comprising cubic boron nitride (cBN) dispersed in a binder matrix comprising metal silicide material; machine tools comprising the composite material; methods of using machine tools comprising the material to machine ferrous work-piece bodies in interrupted mode; and methods of making the composite material and machine tools comprising it.

BACKGROUND

U.S. Pat. No. 8,419,814 discloses depositing of a nano-sized titanium nitride, (TiN) and tantalum nitride (TaN) microstructures onto surfaces of cBN grains, by a process involving treating the cBN grains to make their surfaces vitreophillic, suspending them in ethanol, introducing $Ta(OC_2H_5)_5$ and $Ti(OC_3H_7)_4$, and further treating the suspension and cBN grains such that each cBN grain became coated with an intimate mixture of titanium and tantalum oxide compounds. The coated cBN grains were heat treated in suitable atmospheres to convert the oxides into nano-sized TiN and TaN. An aggregation comprising a plurality of cBN grains thus coated was formed and subjected to pressurisation at ultra-high pressure and high temperature, resulting in crack free PCBN material comprising about 84 volume percent cBN within a binder matrix substantially consisting of a mixture of TiN and TaN. In machining tests, the PCBN samples exhibited superior performance, which might have been due to the grain size of the binder matrix being close to the Hall-Petch nano-grain size.

U.S. Pat. No. 5,288,297 discloses a cBN compact comprising 40 to 90 volume percent of cBN crystals bonded by 60 to 10 volume percent of a bonding matrix comprised mainly of an intimate mixture of silicon nitride and metallic di-boride, where the metal is chosen from the group of titanium (Ti), zirconium (Zr) and hafnium (Hf) atoms. The silicon nitride and metallic di-boride each comprise at least 25 volume percent of the bonding matrix, which is strongly and coherently bonded to the cBN crystals. A method for producing the cBN compact by means of reaction bonding metal silicide compounds with the cBN grains is disclosed.

There is a need for relatively strong and wear resistant cBN composite material having relatively long working life when used to machine ferrous work-piece bodies, particularly but not exclusively in heavily interrupted machining modes.

SUMMARY

Viewed from a first aspect there can be provided composite material consisting of at least 65 volume percent cubic boron nitride (cBN) grains dispersed in a binder matrix, the binder matrix comprising a plurality of microstructures bonded to the cBN grains and a plurality of intermediate regions between the cBN grains; the microstructures comprising nitride or boron compound of a metal; and the intermediate regions including a silicide phase containing the metal chemically bonded with silicon; in which the content of the silicide phase is 2 to 6 weight percent of the composite material, and in which the cBN grains have a mean size of 0.2 to 20 µm. The cBN composite material may also be referred to as polycrystalline cubic boron nitride (PCBN) material.

Various composite materials are envisaged by this disclosure, of which the following are non-limiting, non-exhaustive examples.

In some examples, the content of the silicide phase in the composite material may be at most about 5 weight percent of the composite material.

In some examples, the silicide phase may be a ceramic or intermetallic phase.

In some examples, the metal may be titanium (Ti). The microstructures may comprise titanium nitride (TiN) and or the microstructures comprise titanium di-boride ($TiB_2$). In some examples, the silicide may comprise titanium silicide material having the chemical formula $Ti_xSi_y$, where x is 0.9 to 1.1 and y is 0.9 to 1.1 (substantially TiSi). In some examples, the silicide may comprise titanium silicide material having the chemical formula $Ti_xSi_z$, where x is 0.9 to 1.1 and z is 1.9 to 2.1 (substantially $TiSi_2$, titanium di-silicide). The metal boride material may comprise titanium di-boride ($TiB_2$) and relative amounts of the titanium di-silicide and the titanium di-boride in the composite material may be such that the ratio of the (311) X-ray diffraction (XRD) peak of the titanium silicide to the (101) XRD peak of the titanium di-boride is 0.2 to 1.1.

In some examples the metal may be hafnium (Hf), tantalum (Ta) or zirconium (Zr).

In some examples, the silicide phase may be spaced apart from the cBN grains by the microstructures.

In some examples, the microstructures may be in the form of coating layers bonded to surface areas of the cBN grains.

In some examples, the content of the cBN grains may be at least about 80 or at least about 90 volume percent of the composite material.

In some examples, the cBN grains have a mean size of 0.1 to 10 microns. In more particular examples, the cBN grains may have mean size of 0.1 to 5 microns, or the cBN grains may have mean size of greater than 5 to 20 microns. The selection of the mean size and size distribution of the cBN grains, such as whether it may have a one or more than one mode, may depend on the type of application in which the composite material is intended to be used.

In some examples, the mean size and or the size distribution of the cBN grains may be selected according to the cBN content, such that the mean volume of the binder matrix between the cBN grains will be neither too large nor too small. In some examples, the cBN grains comprised in composite material having a relatively high content of cBN grains (at least about 80 or 90 volume percent) may be relatively larger than in composite material having a relatively lower content of cBN grains. In some examples, the mean size of the cBN grains in composite material comprising at least 80 or at least 90 volume percent cBN grains may be greater than 5 microns or greater than about 10 microns. In other examples, the mean size of the cBN grains in composite material comprising less than 90 or less than 80 volume percent cBN grains, may be greater than 0.1 microns or greater than about 5 microns, and less than about 10 microns. While wishing not to be bound by a particular theory, the mean size and or size distribution of the cBN grains may be balanced against the content of the cBN in the composite material in order to achieve an overall amount of residual silicide according to this disclosure. This may help control the silicide content of the composite material, achieving silicide content that is not too high (potentially as a result of the regions between the cBN grains being too large) and not too low (potentially as a result of the regions between the cBN grains being too small).

In some examples, the area distribution of the cBN grains as viewed on a surface of the composite material may have at least two modes.

In some examples, the binder matrix may comprise silicon nitride ($Si_3N_4$).

In some examples, the content of the silicide phase may be 20 to 60 weight percent of the binder matrix.

Viewed from a second aspect, there is provided a method of using example disclosed composite material, the method including providing a machine tool comprising a cutting edge comprising the composite material; using the machine tool to machine a work-piece comprising ferrous material in interrupted mode, in which the work-piece is configured such that the continuous engagement length is 30 to 50 percent of a distance traversed between the cutting edge and the surface of the work-piece during the machining operation.

In some examples, the work-piece may be configured such that at least a part of the work-piece presents an engagement angle to the cutting tool, the engagement angle being 30 to 90 degrees.

In some examples, the work-piece may comprise material having hardness of at least 50, at least 52, at least 60 or at least 62 on the Rockwell 'C' hardness scale (HRC).

In some examples, the work-piece may comprise steel, cast iron or super-alloy material. For example, the work-piece may comprise steel and or grey cast iron material.

In some examples, the machine tool may comprise the composite material joined to a support body.

In some examples, the machine tool comprises an indexable insert. For example, the machine tool may be configured for use in a turning or milling operation, and the method may include using the machine tool in a turning or milling operation. In some examples, the work-piece may be suitable for the manufacture of a brake disc, and the method may include machining the work-piece to make a brake disc.

Viewed from a third aspect, there is provided a method of making an article comprising example disclosed composite material, the method including combining a silicide phase precursor with a plurality of cBN grains to provide a raw material combination, the silicide phase precursor selected such that the metal will be capable of reacting with the cBN grains to form a nitride or boride reaction product; in which the content of the cBN grains in the raw material combination is such that the content of the cBN grains in the composite material will be at least 65 volume percent of the composite material; subjecting the raw material combination to a pressure at which cBN is a thermodynamically stable phase, and a temperature sufficiently high and for a sufficient period of time for some of the metal contained in the silicide phase precursor to react with the cBN grains to form the plurality of microstructures reaction-bonded to the cBN grains; and for remaining metal silicide phase to be 2 to 6 weight percent of the composite material or 20 to 60 percent of the binder matrix, being the balance of material other than the cBN comprised in the compound material.

In some examples the remaining metal silicide phase is 2 to 5 weight percent of the composite material or 20 to 50 percent of the binder matrix, being the balance of material other than the cBN comprised in the compound material.

In some examples, the silicide phase precursor may be in powder form, and the mean grain size of the grains of the silicide phase powder may be 0.1 to 5 microns.

In some examples, the metal comprised in the silicide phase precursor may be titanium (Ti). In some examples, the silicide may comprise a titanium silicide material having the chemical formula $Ti_xSi_y$, where x is 0.9 to 1.1 and y is 0.9 to 1.1 (substantially TiSi). In some examples, the silicide may comprise a titanium silicide material having the chemical formula $Ti_xSi_z$, where x is 0.9 to 1.1 and z is 1.9 to 2.1 (substantially $TiSi_2$, titanium di-silicide).

In some examples, the silicide phase may include hafnium (Hf), tantalum (Ta) or zirconium (Zr).

In some examples, the method may include producing the silicide phase precursor, by combining the metal and Si in elemental form such that the metal and the Si will be capable of reacting with each, forming a pre-reaction combination; treating the pre-reaction combination such that the metal reacts with the Si to form reacted material comprising the silicide phase; and comminuting the reacted material to provide a plurality of the grains of the silicide phase. The method may include comminuting the reacted material by means of attrition milling.

In some examples, the temperature at which the composite material is sintered at the ultra-high pressure may affect the overall content of the residual silicide phase in the composite material. In particular, relatively lower sintering temperatures (all else being substantially equal) may result in a higher content of the residual silicide phase.

Viewed from a fourth aspect, there can be provided a machine tool suitable for machining ferrous work-piece in interrupted mode, comprising example disclosed composite material, in which a cutting edge, a rake face and a flank face comprise the composite material. The machine tool may be for turning or milling the work-piece.

Non-limiting examples of composite material and machine tools will be described with reference to the accompanying drawings, of which

DETAILED DESCRIPTION

With reference to FIG. 1A, FIG. 1B, FIG. 2A and FIG. 2B, example composite material may comprise a plurality of cBN grains 10 comprising about 90 volume percent of the composite material, dispersed in a binder matrix, the binder matrix comprising a plurality of microstructures 12 reaction-bonded to the cBN grains 10 and a plurality of intermediate regions 14 within interstices between the cBN grains 10. The microstructures 12 may comprise titanium nitride (TiN) and titanium di-boride ($TiB_2$); in particular the microstructures 12 may contain more $TiB_2$ than TiN and potentially a minor amount of $Si_3N_4$ grains, which appears to be present in in the binder matrix in a trace amount of not more than about 1 to 2 volume percent of the composite material. Some parts of the intermediate regions 14 appear to comprise a titanium silicide phase, particularly $TiSi_2$ and probably TiSi, and other parts appear to comprise $TiB_2$. Other regions 16 appear to contain silicon nitride ($Si_3N_4$). The content of the titanium silicide phase will be 2 to 6 weight percent or 2 to 5 weight percent of the composite material.

Figure 1A:
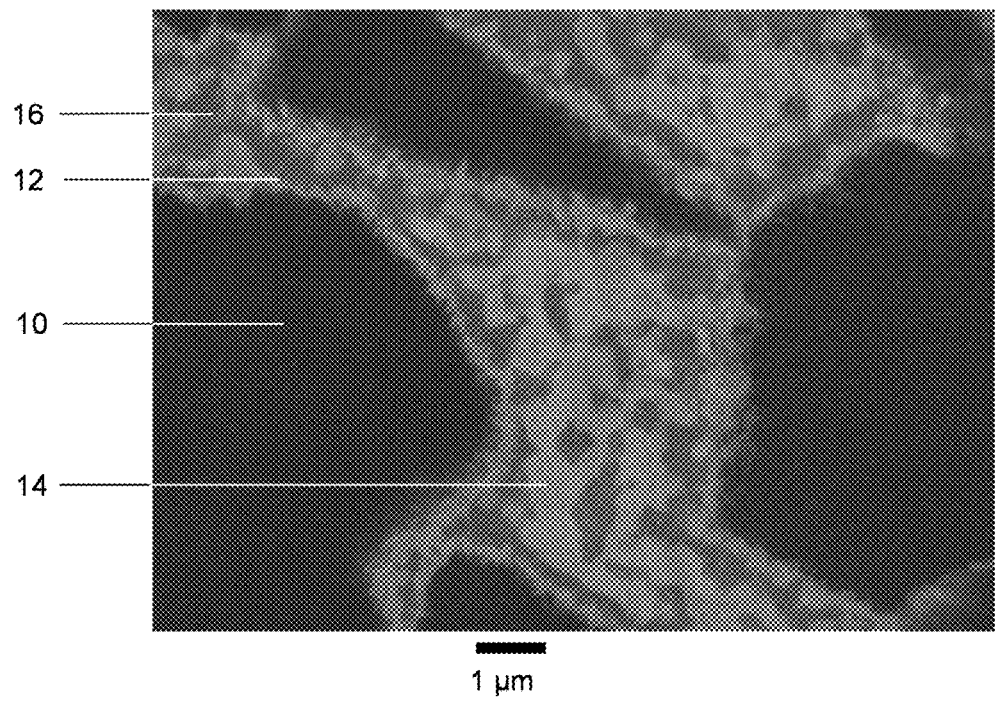
FIG. 1A and FIG. 1B show scanning electron micrograph (SEM) images of composite material according to Example 2 described below, at two different magnifications as indicated by the scale bar showing 1 micron.
Figure 1B:
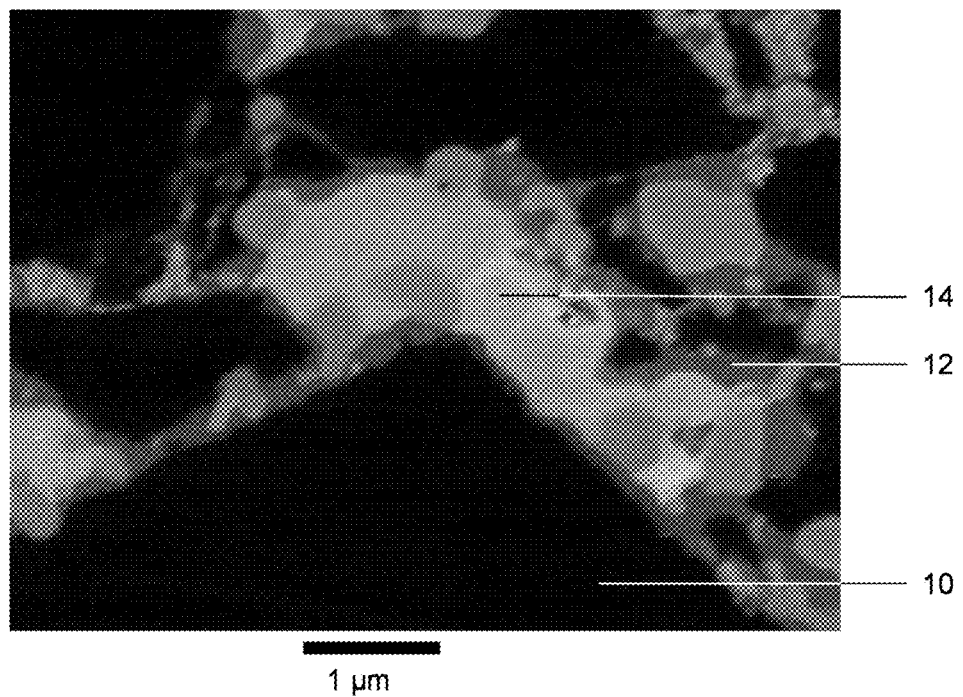
Figure 2A:
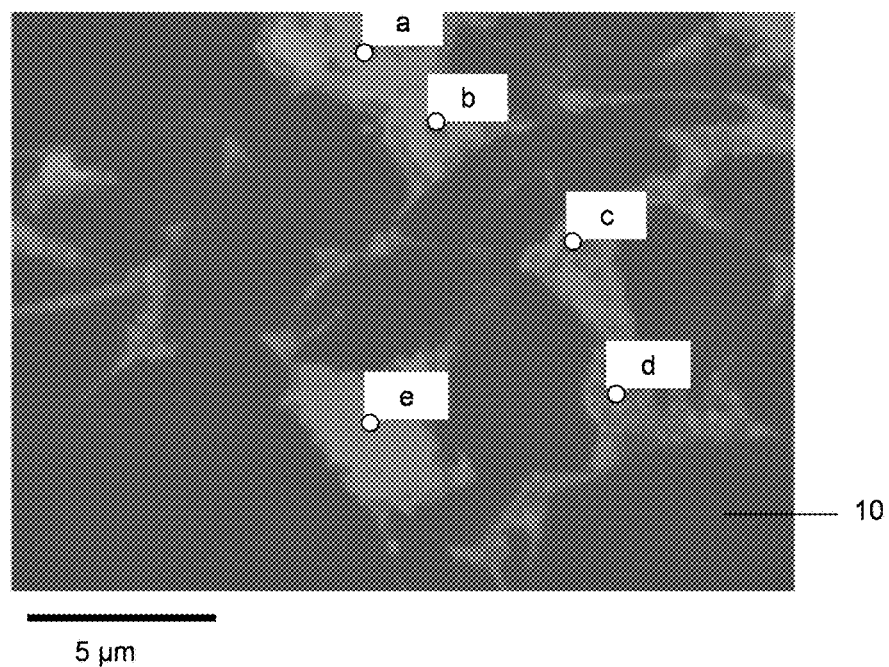
FIG. 2A and FIG. 2B show two SEM images of example composite material, including number references corresponding to points at which energy dispersive spectroscopy (EDS) spectra were obtained.
Figure 2B:
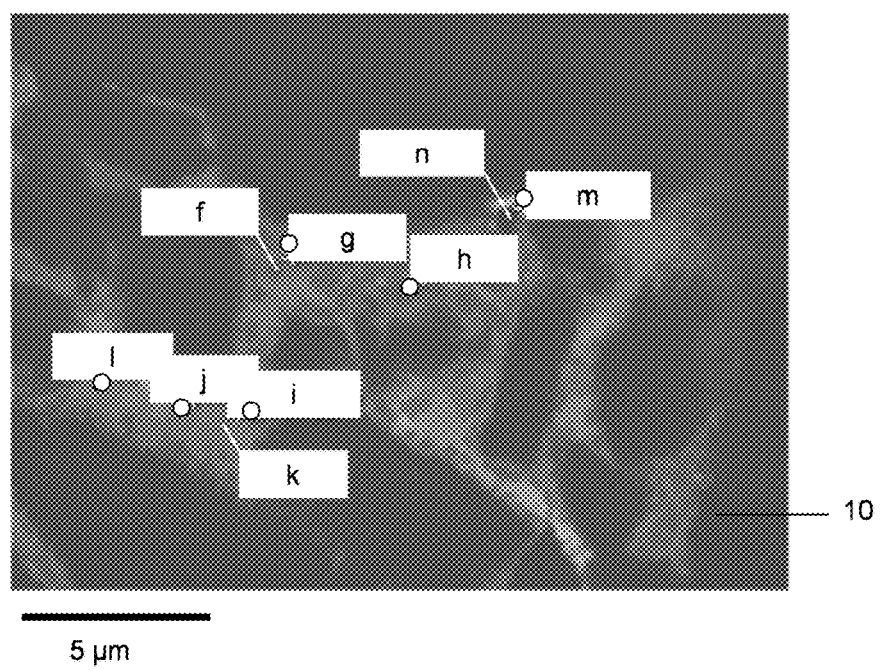

With reference to FIG. 2A and FIG. 2B, energy dispersive spectroscopy (EDS) analysis was carried out in situ to give an indication of the principle elements at various points on area sections of surfaces of example composite material and the results are summarised in Table 1. Based on the relative molar amounts of the elements detected, potential non-limiting and mon-exhaustive compounds or phases are mentioned for some of the points.

The bulk composition of the reaction product material may be approximately equivalent to $Si_3Ti_2$, in the form of coarse granules, which may be comminuted by means of attrition milling for up to about 4 hours, for example, to provide a finely dispersed blended powder, the particles of which having a mean size of at most about 10 microns or at most about 3 microns. Using attrition milling to comminute the titanium or other silicide granules is a relatively aggressive, high power method and will likely be capable of reducing the size of the granules to very fine powder having a mean grain size of about 1.5 to 2.5 microns in size. Intermetallic $TiSi_2$ and other titanium silicide phases are more brittle than the precursor Ti and Si in elemental form, which may make it easier to control the comminution of the silicide phases to produce very finely divided grains by means of attrition milling than it would likely be for other sources of the precursor elements. In addition, the silicide phases tend to be substantially more resistant to oxidation than elemental Ti and Si; oxidation of Ti and or Si would likely reduce effective sintering or bonding with the cBN for form the cBN composite material. The reaction of the Ti with the Si may be carried out in vacuum in order to promote the removal of oxygen that may be present.

TABLE 1

| Point ref. | Potential phases | Ti wt. % | Ti mol. % | Si wt. % | Si mol. % | N wt. % | N mol. % | B wt. % | B mol. % | O wt. % | O mol. % |
|---|---|---|---|---|---|---|---|---|---|---|---|
| a | $TiSi_2$ | 45 | 33 | 55 | 67 | | | | | | |
| b | $TiSi_2$ | 48 | 33 | 49 | 57 | | | 3 | 10 | | |
| c | Ti-rich, $Si_3N_4$ | 25 | 12 | 47 | 39 | 29 | 49 | | | | |
| d | B-rich, cBN | 8 | 2 | 8 | 4 | 39 | 38 | 44 | 55 | 2 | 1 |
| e | $TiSi_2$ | 43 | 30 | 58 | 70 | | | | | | |
| f | $TiSi_2/Si_3N_4$ | 30 | 15 | 41 | 35 | 29 | 49 | | | | |
| g | $TiSi/Si_3N_4$? | 35 | 17 | 28 | 23 | 30 | 50 | | | 7 | 9 |
| h | $TiB_2$, $Si_3N_4$ | 32 | 14 | 29 | 22 | 21 | 32 | 13 | 25 | 5 | 7 |
| i | cBN | | | | | 56 | 50 | 44 | 50 | | |
| j | cBN | | | | | 57 | 51 | 42 | 49 | | |
| k | cBN | | | | | 57 | 51 | 43 | 49 | | |
| l | $TiSi_2$ | 53 | 39 | 48 | 61 | | | | | | |
| m | TiN, $Si_3N_4$ | 17 | 7 | 40 | 30 | 43 | 63 | | | | |
| n | $TiB_2$?, cBN | 10 | 3 | 17 | 9 | 32 | 34 | 40 | 54 | | |

An example method of manufacturing example cBN composite material will be described.

A mixture or alloy comprising silicon (Si) and titanium (Ti) can be made by blending together Ti and Si powders in a suitable ratio, such as 2Ti+3Si, and treating blended powders in vacuum at an elevated temperature, for example. The reaction product may include one or more titanium silicide alloy or intermetallic phase of one or more of the compounds TiSi, $TiSi_2$ or $Ti_5Si_3$, which may be produced in combination with each other. The Si and Ti powders can be intimately blended and sealed in an evacuated silica tube or metal-encased vacuum furnace (for example, a molybdenum alloy interior wall vacuum furnace) for the heat treatment at a temperature of about 1,000 to about 1,200 degrees Celsius. For example, the blended powders may be heat treated under vacuum at a temperature of about 1,100 degrees Celsius for about 15 to 30 minutes. In an experiment in which the blended Ti and Si powders were blended together and subjected to vacuum heat treatment at a temperature of 1,000 degrees Celsius for 2 hours, X-ray diffraction (XRD) analysis revealed that some residual unreacted Si was evident in the reaction product material, while no evidence of unreacted Si was evident when the heat treatment was carried out at 1,100 degrees Celsius for 2 hours.

While wishing not to be bound by a particular theory, relatively fine titanium or other silicide powder of about 1 to about 5 microns may result in a more uniform blend of the grains and consequently more homogeneous microstructure and or superior properties of the sintered cBN composite material. In particular, very finely divided silicide phase grains would have a relatively high specific surface area for reacting with the cBN grains, potentially resulting in more effective reaction sintering of the cBN composite material. Titanium silicide powder (or other kinds of silicide powder such as hafnium silicide or zirconium silicide powder) having grain size of less than about 0.1 micron may increase the risk of introducing too much surface oxygen into the raw material powder blend, since the specific surface area will be relatively large and oxide compounds and other impurities may likely be attached to the powder surfaces. The presence of too much oxygen in the raw material powder will likely be deleterious to certain of the properties and behaviour in use of the sintered composite material.

The fine titanium silicide powder can then be blended with a plurality of cBN grains, which may have a mean size of 0.1 to about 5 microns, and the size distribution of which may exhibit one, two or more modes (which may also be referred to as peaks). For example, sonication means may be used for blending the cBN grains with the titanium silicide powder. In some example methods, the cBN grains and the silicide powder may be blended by means of shear mixing, in which the powders may be mixed in hexane or other suitable fluid medium and then dried and sieved to select grains of a suitable size, such as about 220 microns. In some example methods, the cBN grains and silicide powders may be mixed by means of a shaker-mixer (such as a Turbula™ blender) with the aid of steel balls, after which the balls will be removed and the blended powder provided. The use of sonication mixing may result in superior homogeneity in the microstructure of the sintered cBN composite material, which may contain fewer and smaller agglomerations of material, or substantially free of material agglomerations evident in the binder matrix.

The relative amounts of the cBN grains and the titanium silicide powder will be selected such that the desired weight or volume content of cBN will be present in the sintered cBN composite material, which will be at least 65 volume percent of the composite material, and may be at least 70, at least 80 or at least 90 weight percent. Loss of a minor amount of the cBN due to reaction of a small amount of the cBN with the Ti and or the Si to form TiN and or $TiB_2$ and or $Si_3N_4$ can be taken into account when blending the cBN grains with the titanium silicide powder. The amount of cBN likely to be lost in this way will likely depend on the specific surface area of the cBN grains, which will likely depend on the shape and size distribution, and the quantity of the cBN grains (in other words, a little more cBN than may at first appear necessary can be added to compensate for this potential effect).

The powder or granules comprising the mixed silicide powder and cBN grains may then be formed and compacted to provide a pre-sinter body such as a disc. The pre-sinter body need not be placed against a cemented carbide substrate and may be encapsulated within a refractory metal jacket and out-gassed at about 750 degrees Celsius in vacuum for about 30 minutes. After the outgassing step, the encapsulated disc may be sealed within an additional refractory metal jacked to provide a double-jacketed pre-sinter body. The encapsulated pre-sinter body will be subjected to a high pressure at which cBN is thermodynamically stable, such as at least about 3 gigapascals (GPa), at least about 5.5 GPa or at least about 6.5 GPa, and a high temperature at which titanium or other metal in the metal silicide can react with the cBN to form $Si_3N_4$, TiN and or $TiB_2$. In general, higher sinter pressures in the range 3 to 8 GPa may likely result in denser sintered composite compacts and exhibit certain superior properties and behaviour in use. In some examples, the pressure may be about 6.5 to about 7.0 GPa and the temperature may be at least about 1,300 to about 1,450 degrees Celsius (in general, higher temperatures may be used when higher pressures are used; so a temperature of about 1,450 degrees Celsius may be used for a pressure of about 6.8 GPa.

The temperature used for sintering the raw material powders will have an effect on the relative amount of residual silicide not having reacted with the cBN; in general and all else being equal, the lower the sinter temperature, the higher may be the content of residual metal silicide in the sintered composite material.

Although the example method described above mentioned principally titanium silicide, the method for making raw material comprising other metal silicide phases such as hafnium silicide or zirconium silicide will be substantially similar.

Certain example cBN compacts appear to be particularly effective for use in heavily interrupted machining operations such as turning or milling of hardened steel having hardness of at least 50 or at least 52 HRC (hardness on the Rockwell C scale) and or cast iron, such as grey cast iron.

While wishing not to be bound by a particular theory, chemical reaction of the cBN grains with elements from the silicide phase powder may result in strong bonding between the cBN grains and the binder matrix. For example, metal boride and or metal nitride reaction product microstructures may be strongly bonded to the cBN surfaces. For such reaction bonding to occur, the silicide phase used as raw material for sintering the cBN composite material would need to contain a metal that is capable of reacting with a source of boron to form a metal boride compound and or with a source of nitrogen to form a metal nitride compound. Potentially, the nitride and or boride reaction products of such metals and the cBN may be in the form of layer- or coating-like microstructures bonded to the cBN grains. The presence of a small amount of relatively brittle material such as the remaining silicide phase, which did not react with the cBN grains, may enhance the impact resistance and strength of the cBN composite material. The silicide compounds such as titanium silicide may be present as intermetallic phases, which may be relatively brittle and potentially more brittle (less strong or tough) than titanium nitride and or titanium boride, and or other materials present in the binder matrix. Potentially, the presence of a small amount of relatively brittle material may have the effect of improving the impact resistance and or strength, particularly the impact strength of the cBN composite material. Impact strength will likely be an important property of material used for the interrupted machining of work-pieces. While wishing not to be bound by a particular theory, this may occur by the silicide phase consuming impact energy by the proliferation of crack within the silicide phase, in effect 'shattering' the silicide phase. For example, when a crack propagating through the cBN composite material arrives at a region or grain of the silicide phase, a substantial amount of its energy may be consumed in such 'shattering', thus attenuating or preventing its further propagation. If too much of the silicide phase were present, then the overall impact resistance of the composite material will likely decrease as the 'shattering' effect will likely have increasingly longer range and occur in too great a volume of the composite material. In addition or alternatively, too high a content of the silicide phase may potentially have a deleterious effect on certain other properties of the composite material, such as chemical or other wear resistance. If too little of the phase were present, potential crack attenuation or inhibition effects may become much less significant or negligible.

While wishing not to be bound by a particular theory, example disclosed cBN composite materials appear to combine an aspect of strong reaction bonding between the cBN grains and the binder matrix, with an amount of remaining residual silicide material that may be effective for enhancing certain mechanical properties of the composite material, such as impact resistance, which may be particularly helpful for interrupted machining.

While wishing not to be bound by a particular theory, an example method used to make the composite material, involving attrition milling the metal silicide material prior to blending it with the cBN grains and thus providing finely divided metal silicide raw material powder, may have an aspect of enhancing the homogeneity of the binder microstructure or altering the binder microstructure in some other way.

Non-limiting and non-exhaustive examples will now be described in more detail.

EXAMPLES 1 TO 6

Six pairs of test machine tools comprising example cBN composite material cut from the same sintered disc were made in order to carry out two kinds of interrupted machining tests as described below. A pair of reference tool comprising reference cBN composite material were also made and tested. All of the example cutting tools had the same configuration and comprised the nominally the same cBN composite material, which comprised 90 volume percent cBN grains, TiN, $TiB_2$, $Si_3N_4$ and titanium silicide intermetallic phases TiSi and $TiSi_2$.

The reference material was AMB90™ PCBN, an Element Six product that is used for heavily interrupted hard turning. The reference material was made by sintering cBN grains blended with aluminium (Al) powder having a mean grain size of about 6 microns, the mass content of the cBN being about 90 percent of the blended powders and the balance consisting of the Al powder. The cBN grains had a mean size in the range of 3 to 8 microns. The blended powders was compacted to form a pre-sinter disc and subjected to a sinter pressure of about 5.5 GPa and a sinter temperature of about 1,250 degrees Celsius for a period of about 30 minutes.

The example cBN composite material was made as follows. Ti and Si powder was blended together in the molar ratio of 3Ti and 2Si and subjected to heat treatment of about 1,100 degrees Celsius in a vacuum furnace evacuated to $10^{-3}$ to $10^{-6}$ millibars (mbar). The reaction product included at least TiSi and $TiSi_2$ in the form of relatively large pieces, which were crushed and sieved to about 212 microns, and then comminuted by means of attrition milling in hexane for 4 hours to provide well blended powder having mean grain size of about 1.5 to 2.5 microns. The attrition milled powder was recovered, dried of in a rotary evaporator and then additionally dried at 60 degrees Celsius in an oven overnight.

The fine titanium silicide powder was blended with 90 weight percent of cBN grains having a mean size of 2 to 20 microns, as shown in Table 4 for the various Examples. Various methods were used to blend the powders for Examples 1 to 6. The cBN and Ti—Si reaction product powder was blended by means of sonication in hexane in Examples 1, 2 and 6; by means of a (Turbula™) shaker-mixer and steel balls in Example 4; a planetary ball mixer for Example 5.

The sonication mixing in Examples 1, 2 and 6 involved adding hexane to Ti—Si reaction product powder and introducing an ultrasonic prove into the resulting suspension, and applying a sonication amplitude of 25% (using a Branson™ apparatus having 2,000 bdc, maximum frequency of 20 kHz, maximum power of 2.2 kW, and full-wave 50 mm diameter titanium horn) for 5 minutes. An amount of cBN powder was then introduced into the suspension, such that the cBN content was 90 weight percent of the combined Ti—Si powder ad cBN mixture, and the combined suspension was sonicated for 10 minutes at the same amplitude. The suspension was dried in a rotary evaporator and then in an oven at 60 degrees Celsius for at least 5 hours. The mixed powder was allowed to cool to about 25 degrees Celsius in nitrogen atmosphere and sieved to less than about 212 microns.

The shaker-mixing of Example 4 involved combining 90 weight percent cBN powder with 10 weight percent Ti—Si reaction product powder and introducing 8 WC balls, each of 8 mm diameter. The powders were shaker-mixed fort 1 hour, following which the WC balls were removed.

The planetary ball mixing of Example 5 involved combining the 90 weight percent cBN grains with 10 weight percent Ti—Si reaction product powder and introducing WC balls having diameter of 3 mm, such that the mass ratio of the combined powder to the balls was 1:2.5. Hexane was added to the mixed powders, such that the volume of powders to that of the hexane was about 2:1. The suspension was subjected to planetary ball milling for 30 minutes at 90 revolutions per minute (rpm). The balls were removed and the slurry or suspension was dried in a rotary evaporator, followed by drying in an oven at 60 degrees Celsius for at least 5 hours. The mixed powder was allowed to cool to about 25 degrees Celsius in nitrogen atmosphere and sieved to less than about 212 microns.

The blended raw material powders comprising the cBN and titanium silicide grains was compacted to form a plurality of discs. The compacted discs were encapsulated within a reaction capsule for an ultra-high pressure furnace (which may also be referred to as an ultra-high pressure press), and subjected to an ultra-high pressure of about 6.8 GPa and a temperature of about 1,450 degrees Celsius for a period of about 10 minutes to provide a sintered disc consisting of the cBN composite material (a slightly lower temperature was used to sinter Example 3). The disc was cut up to form cutter element precursor bodies, which were then further processed by means of diamond grinding to provide the six cutter elements for the six example cutting tools.

Figure 3:
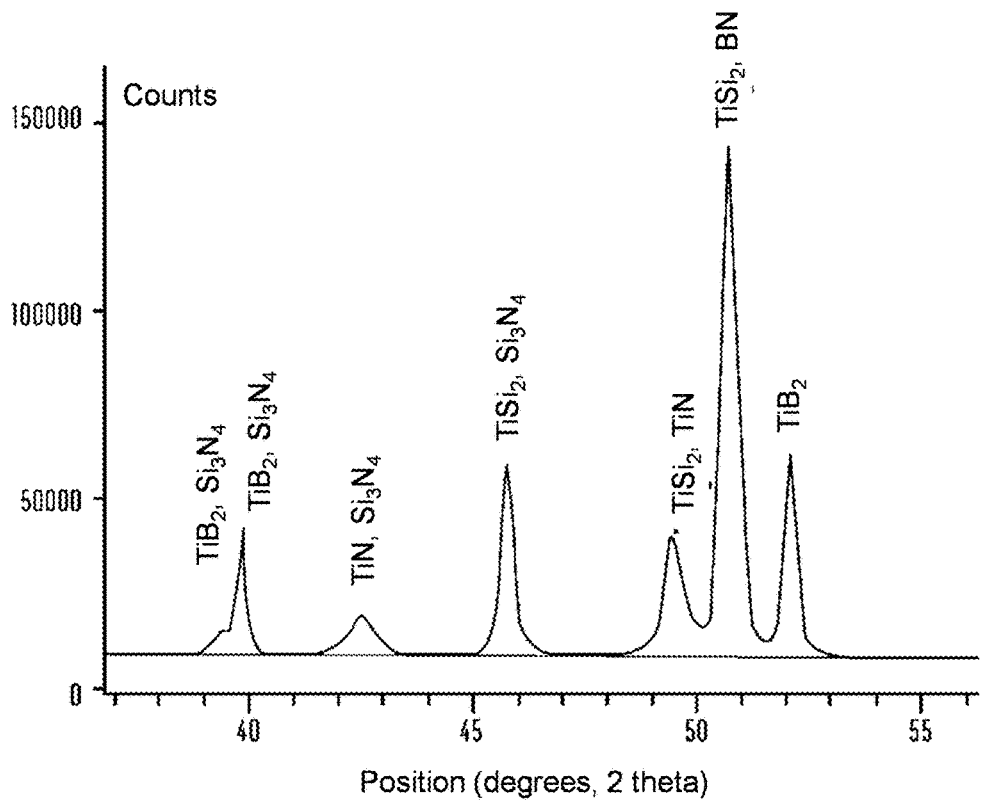
FIG. 3 shows an X-ray diffraction graph of example composite material, in which the main peaks have been identified.

With reference to FIG. 3, the ratio of the height of the titanium silicide ($TiSi_2$) (311) X-ray diffraction XRD peak near about 2Θ of 45.77 degrees to that of the titanium di-boride ($TiB_2$) (101) peak 2Θ of 52.1 degrees on the XRD spectrum were measured for Examples 2 and 6. These ratios were measured to be about 0.37, which appears to indicate that the composite material had a relatively low content of $TiSi_2$ and perhaps other titanium silicide material (in other Examples 7 and 9 described below, in which the cBN content was 65 volume percent, this ratio was about 1.0). It is estimated that this may indicate that the content of titanium silicide material may be about 2 to 3 weight percent of the cBN composite material.

Example turning tools were made comprising the Example cBN composite material. The sintered cBN composite discs were cut into pieces having dimension 10×10 mm, each having thickness of 3.2 mm. The tool cutting edge was prepared by forming a 25 degree chamfer angle and 20 micron edge hone, and a −6 degree rake angle. The tools were tested in a K30 grey cast iron cast iron test (similar to brake disc machining) and a so-called H30 'O1 clock test'.

One of each pair of Example tools was tested in a turning test, in which the cutter insert was used to machine (turn) a body consisting of hardened steel, under conditions selected to have similarities with H25 or H30 hard turning. Each test was terminated when the edge of the cutter, defined by example cBN composite material, had become fractured to the extent that the size of the fracture scar (measured parallel to the cutting velocity vector) is greater than the mean size of the flank wear scar, or length of the flank wear scar reaches at least 0.3 millimetres. The occurrence of either of these occurrences was the end of life criterion, which may be evident in a relatively sudden change in the measured cutting force. Catastrophic edge fracture may occur before a flank wear land dimension of 0.3 millimetre (mm) has formed. The performance of the cBN composite material can be reported in terms of the number of passes required for the end of life criterion to be achieved; the greater the insert life, the better the performance of the cBN composite material in the test. This result is expected to provide an indication of the potential working life of the cBN composite material in certain industrial machining applications involving the interrupted cutting of steel bodies.

Figure 6:
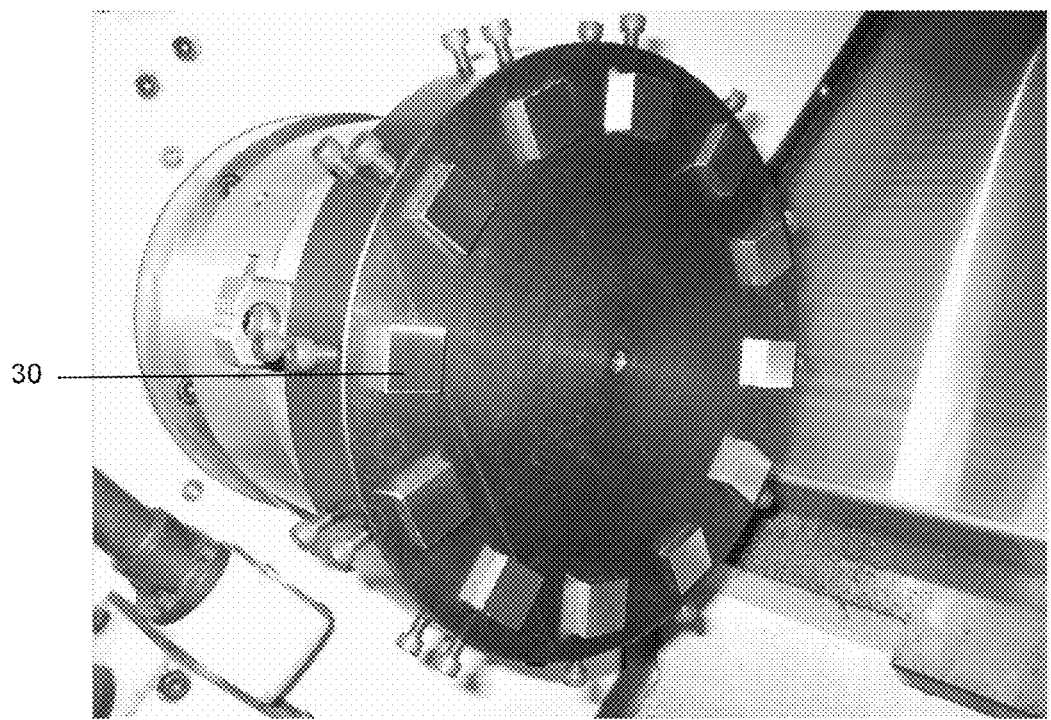
FIG. 6 shows a photograph of a perspective view of the test work-piece used for carrying out H30 machining tests on example and reference composite materials.

The test work-piece is shown in FIG. 6 comprised a series of bars 30 projecting axially from a circumference of a circular plate (hence the name 'clock test'). Each of the bars presented an engagement angle of 90 degrees to the tools and had substantially the same hardness throughout its volume (which may also be referred to as "through hardened"), the Rockwell C hardness being in the range of about 60 to 60 HRC, being a hardened steel material according to the AISI 4340 specification. The test is believed to provide a reasonably good indication of the potential performance of the PCBN material in machining case hardened steels (in particular but not exclusively) in many applications in practice. The test work-piece and the cutting conditions were configured to subject the tool to a particular ratio of continuous and interrupted cutting conditions, this ratio being substantially constant for each cutting cycle (which may be referred to as a "pass"). In particular, this ratio was kept substantially constant throughout the test by adopting a face-turning approach with constant surface speed control. A series of arcuate spaces between the bars 30 were provided parallel to the longitudinal axis of rotation of the test work-piece axis such that the diameter and pitch spacing of the holes is expected to present turning conditions likely to be representative of certain common hard turning operations in industry.

The other of each pair of Example tools was used in a K30 interrupted machining test in which the work-piece consisted of grey cast iron and the response variable was the size of the wear scar after a certain distance of cutting (material removed from the work-piece). Further particulars of the H30 and K30 tests are presented below. The test parameters used in the 'brake disc' K30 and H30 'clock test' using O1 tool steel is provided in Table 2. Information about the grade of the grey cast iron material used in the K30 test is shown in Table 3. The grade used provides relatively good wear resistance, strength and heat treatment response compared to other grades GG20 and GG25, and has reasonable machinability and excellent surface finish. The Brinell hardness of the grade of grey cast iron used was 190 to 260. In general, PCBN tools are used for machining grey cast iron at relatively high cutting speeds, as shown in Table 2.

TABLE 2

|  |  | K30 Break disc test | H30 Clock test |
|---|---|---|---|
| Cutting conditions | Cutting speed, m/min. | 1,200 | 180 |
|  | Feed, mm/rev. | 0.3 | 0.3 |
|  | Depth of cut, mm | 0.4 | 0.2 |
| Work-piece |  | Brake disc 300 mm | O1 tool steel (about 62 HRC) |
| Insert geometry |  | SNMN0904*08S02025 |  |
| Failure |  | Wear after 6 discs | Catastrophic failure |
| Tool holder |  | 75° approach, −6 rake |  |

TABLE 3

|  | DIN | EN |
|---|---|---|
| Grade | GG30 | EN-GJL-300 |
| Comparable with | Meehanite GB300 |  |
| Standard | DIN 1691 | EN 1561 |
| Alloy number | 0.6030 | EN-JL 1050 |

Scanning Electron Microscopy (SEM) and X-Ray Diffraction (XRD) analysis confirmed the presence of a substantial amount of titanium di-boride ($TiB_2$) and silicon nitride ($Si_3N_4$) phases, which likely arose due to reaction bonding between the cBN grains and the sources of titanium (Ti) and silicon (Si). The example tools exhibited improvements of up to about 100 percent in terms of tool life in H30 applications and 30 percent in terms of wear resistance in K30 applications.

Figure 4:
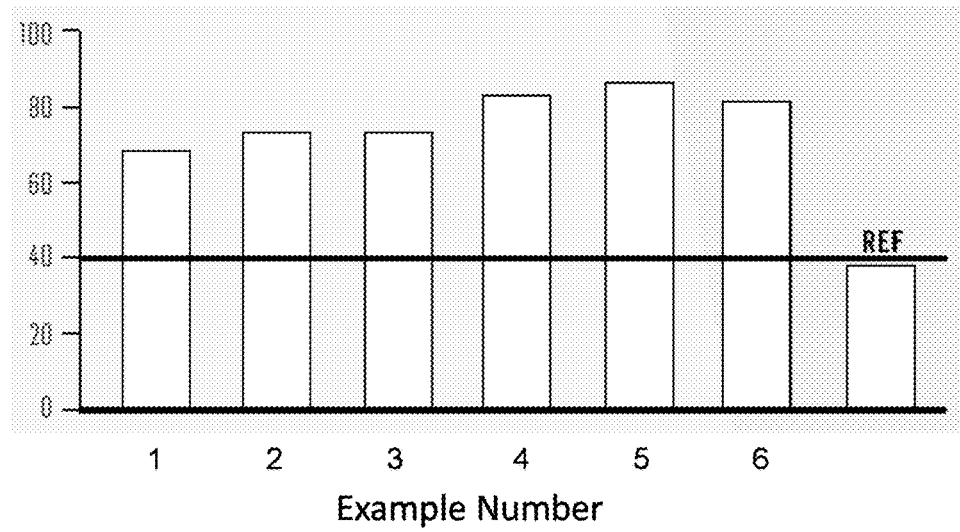
FIG. 4 shows a bar chart comparing the working lives of cutter elements in a machine test referred to as 'H30 heavy interrupted hard part turning' (six of the cutter elements comprised example composite material and one cutter element comprised a reference composite material)
Figure 5:
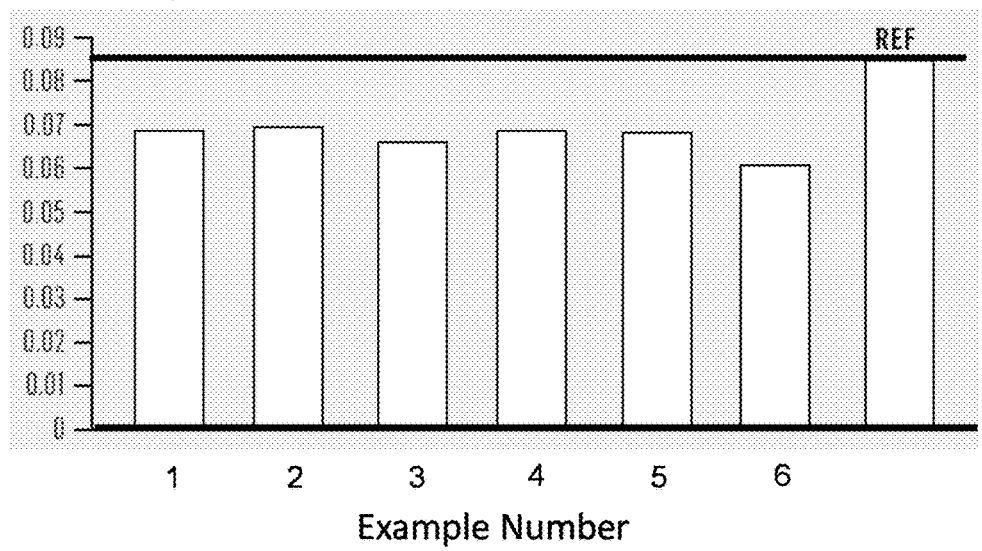
FIG. 5 shows a bar chart comparing the wear scars formed into cutter elements in a machine test referred to as 'K30 heavy interrupted grey cast iron brake disc turning' (six of the cutter elements comprised the same example composite material and reference material as in FIG. 4)

The results of the H30 and K30 cutting tests of each of the six pairs of Example tools is summarised in Table 4, together with the corresponding results achieved using the reference material. The machining test results are also shown graphically in FIG. 4 and FIG. 5, and indicate that the Example cBN composite material performs substantially better than the Reference sample in both tests. In the H30 test, the mean number of passes exhibited by the Example cutters was about 76 with a standard deviation of about 6, whereas the number of passes for the Reference cutter was about 38. In the K30 test, the mean wear scar size that formed in the Example cutters was about 68 microns with a standard deviation of about 4 microns, whereas the wear scar in the Reference cutter was about 85 microns.

TABLE 4

|  | Volumetric D[4,3] mean cBN grain size, μm | Relative wt.% of cBN in the size | cBN content, wt % | XRD peaks $\frac{TiSi2\ (311)}{TiB2\ (101)}$ | H30 test: no. of passes to failure | K30 test: wear scar size, μm |
|---|---|---|---|---|---|---|
| Example 1 | 20 | 75% | 90 |  | 68 | 69 |
|  | 6-7 | 25% |  |  |  |  |
| Example 2 | 20 | 90% | 90 | 0.37 | 72 | 70 |
|  | 3 | 10% |  |  |  |  |
| Example 3 | 20 | 75% | 90 |  | 72 | 68 |
|  | 6-7 | 25% |  |  |  |  |
| Example 4 | 12-15 | 100% | 90 |  | 82 | 70 |
| Example 5 | 20 | 75% | 90 |  | 83 | 70 |
|  | 6-7 | 25% |  |  |  |  |
| Example 6 | 7.5-10.5 | 100% | 90 | 0.37 | 80 | 60 |
| Reference |  |  | 90 |  | 38 | 85 |

These results appear to provide strong evidence that cBN composite material comprising 90 volume percent cBN grains reaction bonded to a binder matrix including a small amount of one or more titanium silicide intermetallic phases has relatively high strength and toughness, and will likely perform well in machining operations involving interrupted machining of hardened steel and grey cast iron.

EXAMPLES 7 TO 10

Titanium (Ti) and silicon (Si) powder having mean grain size of about 30 to 50 microns and 99.5 and 99 percent purity, respectively, were mixed in the molar ratio 2Ti+3Si (a weight ratio of 53 percent Ti and 47 percent Si) by means of a shaker-mixer for 1 hour with the aid of steel balls. The mixed powders were subjected to heat treatment in a vacuum at 1,100 degrees Celsius for 2 hours and the Ti—Si reaction product material was subjected to attrition milling for 4 hours. X-ray diffraction (XRD) analysis of the Ti—Si reaction product material indicated that the mean content of oxygen was about 8 weight percent (plus or minus about 5 weight percent).

In the various Examples, the attrition milled silicide reaction product material was blended with cBN grains having mean size as shown in Table 5 by means of a shaker-mixer (a Turbula™ mixer) and steel balls for about 1 hour and the mixed powder compacted into discs each having a mass of 50 grams (g). The cBN content in the raw material was 90 weight percent and the balance was the TiSi reaction product material. Each disc was encapsulated within a refractory metal jacket, outgassed at 750 degrees Celsius in vacuum for 30 minutes, sealed within an additional refractory metal jacket and subjected to pressurisation at about 5.5 gigapascals (GPa) at a temperature of about 1,250 degrees Celsius to provide the Examples 7 to 10.

Scanning electron microscopy (SEM) analysis revealed no evidence of substantial agglomeration in any of these Example composite materials, suggesting that the finely-divided Ti—Si reaction product material had been very effectively and homogeneously blended with the cBN grains. Clear evidence of reaction sintering of the cBN grains with the binder matrix was evident.

TABLE 5

| | Volumetric D[4,3] mean cBN grain size, μm | Flank wear, Vb, μm |
|---|---|---|
| Example 7 | 12-15 | 67 |
| Example 8 | 7.5-10.5 | 70 |
| Example 9 | 12-15 | 71 |
| Example 10 | 7.5-10.5 | 73 |

Example machine tools were made comprising each of the example cBN composite materials and subjected to a test in a K30 type application, which will likely provide an indication of the performance of the composite material in the machining of brake discs. The response variable of the test was the size of the wear scars that formed at the cutting edge of the machine tool after a certain number of cutting passes (the so-called 'Vb' length), which is shown in Table 5 for each of the Example tools. In terms of this measure of performance, all of Examples 7 to 10 exhibited superior performance to the reference AMB90™ PCBN material.

EXAMPLES 11 TO 15

Example cBN composite material comprising 65, 80 and 90 volume percent were made using the method substantially as explained in relation to Example 1 to 6, except that temperature used for sintering Example 15 was estimated to be about 100 to 200 degrees Celsius lower than used for the other Examples.

The materials were subjected to XRD analysis. The ratio of the height of the titanium silicide ($TiSi_2$) (311) X-ray diffraction XRD peak at about 2Θ of 45.77 degrees (the most intense peak for $TiSi_2$) to that of the titanium di-boride ($TiB_2$) (101) most intense peak at 2Θ of about 52.1 degrees on the XRD spectrum were measured and the results are presented in Table 6.

TABLE 6

| | Volumetric D[4,3] mean cBN grain size, μm | cBN content, vol. % | XRD peaks $\frac{TiSi2\ (311)}{TiB2\ (101)}$ |
|---|---|---|---|
| Example 11 | 5 | 65 | 1.00 |
| Example 12 | 5 | 80 | 0.43 |
| Example 13 | 5 | 65 | 1.06 |
| Example 14 | 5 | 80 | 0.44 |
| Example 15 | 10 | 90 | 0.93 |

The amount of residual silicide remaining in the composite material appears to be affected by at least the mean size and potentially the size distribution of the cBN grains, the content of the cBN grains in the composite material and the temperature at which the composite material is sintered. This latter point is indicated by the fact that the $TiSi_2/TiB_2$ ratio for Example 15 is higher than may be expected from inspection of the other data, since the trend is for the ratio to be higher for relatively low cBN content and lower for relatively high cBN content. While wishing not to be bound by a particular theory, it appears that the reduction of the sinter temperature for Example 15 resulted in a higher ratio (that is, a relatively higher content of silicide phase).

Certain terms and concepts as used herein are briefly explained below.

As used herein, a machine tool is a powered mechanical device that may be used to manufacture components by the selective removal of material from a work-piece, a process that may be referred to as machining. A body to be machined in the manufacture of an article may be referred to as a work-piece material and, in general, may comprise metal, alloys, composite materials, wood, polymers, including carbon fibre-reinforced polymers. A cutting tool may have a rake face, being a surface or surfaces over which chips from the work-piece, the rake face directing the flow of newly formed chips. 'Chips' are the pieces of a body removed from the work surface of the body by a machine tool in use. The flank of a cutter insert is the surface that passes over the machined surface produced on the body by the cutter insert. The flank may provide a clearance from the body and may comprise more than one flank face. A cutting edge is the edge of a rake face intended to perform cutting of a body.

As used herein, 'roughing' refers to an aggressive form of machining in which work-piece material is removed at a relatively high rate by using a large depth of cut and feed rate. This is distinguished from "finishing", where the objective being to produce a high tolerance finish, and so the depth of cut and feed rates are lower. In roughing operations, the load on the cutting edge of a tool is far greater than in finishing operations and so the cutting edge needs to be much stronger in a roughing operation, especially when the rake angle is positive. This makes hard or super-hard, but relatively brittle materials generally unsuitable for roughing certain difficult-to-machine work-piece materials, such as titanium alloys. For example PCD, PCBN or advanced ceramics are not typically used for the rough machining of difficult-to-machine materials, despite the high abrasion resistance of these materials.

In rough machining operations, the feed rate and depth of cut are relatively high and the load on the cutting edge of the tool is high, often in the range of about 5 to 10 kN (kilonewtons). Rough machining is frequently undertaken on work-pieces which include an "interrupt" aspect, which may be intentional or unintentional. For example, an interrupt may be in the form of a "V" groove or porosity from gases evolved during casting, slag or sand particles. In rough machining, dimensional tolerance is not as critical as in finishing operations and flank wear values up to and in excess of 1 mm may be permitted. Consequently, it is likely that chip resistance rather than wear is the dominant failure mode in rough machining.

Cutting tools comprising cBN composite material such as PCBN material may be used to machine three broad groups of ferrous materials, namely hardened steel ("hard turning"), sintered powder metals comprising hard grains in a relatively softer matrix, and grey and hard cast irons. Example types of hardened steels may have Rockwell 'C' hardness of at least 50 HRC or at least 52 HRC.

A machining operation may involve a cutting tool remaining engaged with a work-piece article (in other words, the body being machined) throughout the entire operation or it may repeatedly engage and disengage the work-piece during the operation. For example, the work-piece may have a relatively complex shape, potentially having recesses and protrusions, and or the machining operation may include milling, in which a rotating cutting tool will repeatedly engage the work-piece only through an arc of the rotation. A mode of machining in which a cutting tool will engage the work-piece and remove material from it through part of the operation and be disengaged from it for the rest of the operation may be referred to as 'interrupted machining' or 'interrupted cutting'. Various factors associated with the configuration of the work-piece will likely influence the machining process and the selection of a suitable cutting tool and material for the cutting edge. In particular, such factors may include the 'engagement angle', the percentage of interrupted cut and the 'continuous engagement length'. Factors associated with the machining operation may include the 'feed rate', the 'rake angle', the 'cutting speed' and the 'depth of cut', to name a few.

The engagement angle and the continuous edge length are parameters that help describe the shape of a lateral cross section through an elongate work-piece to be subjected to turning, in which the work-piece will be rotated rapidly about a central longitudinal axis connecting opposite ends of the work-piece and a cutting tool is positioned so as to engage and cut material adjacent the surface of the work-piece. The cutting tool may also be moving radially inwards as the outer radial dimension of the work-piece will be reducing as a result of the cutting operation, and may me moving along the side of the work-piece, in a direction aligned with the longitudinal axis of the latter.

A test work-piece body to be machined may have the general shape of a central round core from which a plurality of spoke formations protrude radially outwards (the work-piece configuration shown and described is used for simplicity and the concepts being described will apply to work-piece configurations in general, including irregular or asymmetric work-pieces). The engagement angle Φ is that between the cutting edge and the side surface of the approaching spoke, about to be engaged and cut by the cutting tool. For example, where work-piece is configured such that sides of the spoke formations lie on radial planes converging on the central longitudinal axis, the engagement angle will be 90 degrees; where the sides of the spoke formations slope inwards other than aligned with radial planes, the engagement angle will be less than 90 degrees. An engagement angle of 90 degrees will present the cutting tool with a particularly harsh impact in the interrupted cutting operation. At the opposite extreme, an engagement angle of 0 degrees will in effect correspond to no interruption at all and the tool will in effect be machining the work-piece in a continuous mode, at least for that portion of the revolution of the work-piece. In fully continuous machining, the cutting edge will remain engaged with the work-piece throughout the entire revolution of the latter (turning is used as an example to explain the concept of engagement angle, which may also apply in other kinds of machining operations).

The abruptness of the engagement angle and with the work-piece material may be characterised by means of a scale extending from 0 to 30, of which 30 indicates the harshest interrupt condition. For example, interrupted cutting of hardened steel may be on a scale of H5 to H30, and of grey or nodular cast iron as used in brake discs for automobiles or other vehicles on a scale of K05 to K30.

The motion of the cutting tool may be characterised in terms of various parameters. For example in so-called 'OD' (outer diameter) machining, the tool will be fed longitudinally along the side of the spinning work-piece, away from one end and towards the opposite end; and in 'face turning', the tool will be radially inwards as it reduces the diameter of the work-piece being cut.

The continuous engagement length refers to the length of the arc of the outermost side of a spoke formation in units of distance or as a percentage of the circumference of the circle circumscribing the radial cross section of the work-piece. It may also be expressed in terms of the time over which the cutting tool engages a spoke formation. The continuous engagement length may refer to the length for an individual spoke formation or the combined lengths of all of the spokes, expressed in units of distance, time or as a percentage of a full revolution.

Machining tests for tools in Interrupted machining of hardened steel (which may also be referred to as 'hard turning') can be divided broadly as H05-10 (90 to 100 percent continuous cutting and lower engagement angle), H15-H20 (the tool is in contact with work-piece about 60 to 80 percent of the time, per unit length in facing and turning applications, and low to intermediate engagement angle) and H25-H30 (continuous machining is approximately 30 to 50 percent per unit length, with varying, but approximately equidistant gaps along the face or outer side. High engagement angles close to 90 degrees are often used, depending on the configuration of the work-piece.

As used herein, a super-hard material has a Vickers hardness of at least about 25 gigapascals (GPa). Diamond and cubic boron nitride (cBN) material are examples of super-hard materials. A super-hard cutter segment will comprise super-hard material, in which the cutting edge will be at least partly defined by super-hard material. Polycrystalline cubic boron nitride (PCBN) material comprises a range of various grades (or types) of super-hard composite materials that include grains of cubic boron nitride (cBN) dispersed within and bonded to a binder matrix.

In some examples of PCBN material, the content of cBN grains is at least about 60 volume percent, at least about 70 volume percent or at least about 80 volume percent.

PCBN may be divided into two broad groups, namely "low cBN" and "high cBN", in which the cBN content is about 30 to 70 volume percent and about 70 to 95 volume percent, respectively. High CBN materials are likely to be used for operations involving a higher degree of interrupted cutting, which may occur as a result of shape features of the work-piece or the material comprised in it. Higher cBN content tends to result in stronger PCBN, which is especially important for interrupted operations.

While super-hard materials are extremely hard, they are generally less strong and tough than cemented carbide materials, and consequently they are more prone to fracture and chipping. Cemented carbide cutting tools may yield better tool life than PCD and PCBN tools due to their higher toughness and chip resistance, despite the fact that PCD and PCBN are vastly more resistant to abrasion. For example, standard texts indicate that carbide tools with negative rake angles should be used for the rough machining, or roughing, of titanium alloys when possible. An advantage of using PCBN tools rather than cemented carbide tools arises from the superior refractory 'hot hardness' of the PCBN material, which will likely be particularly advantageous in higher speed cutting operations, in which the speed may be at least 150 metres per minute (m/min) and relatively higher temperatures will be generated at the interface between the cutting tool and the work-piece.

Although cBN is relatively unreactive with ferrous metals, chemical wear of CBN grains comprised in PCBN material is likely to be evident at the high temperatures reached in continuous machining. Therefore, high PCBN comprising a relatively high content of cBN grains is likely to be used in operations such as interrupted machining, in which the tool insert material needs to be relatively strong and maintain its hardness at relatively high temperatures. PCBN material comprising a relatively lower content of cBN grains is likely to be used in operations such as continuous machining, in which the tool insert material needs to be relatively resistant to chemical wear. The strength of PCBN material comprising relatively large cBN grains is generally likely to lower than that of PCBN material comprising relatively small (fine) cBN grains, all else being equal (this may be particularly evident where the content of cBN is relatively high). Therefore, fine grain PCBN is likely to be stronger and produce a better work-piece surface finish than coarser grain PCBN material.

In general, it may be expected that PCBN material comprising relatively coarse cBN grains would result in too poor a surface finish of the work-piece in some applications. Therefore, the cBN comprised in PCBN material for machining operations has tended not to be substantially greater than about 4 microns and most commercially used PCBN materials comprise cBN grains in the range of about 1 micron to about 2 microns. Disclosed example PCBN materials (also referred to as cBN composite materials) span a wider range of grain sizes, having mean (d50) values of 2 to 20 microns.

Intermediate machining operations involving a degree of interrupted cutting in combination with high machining speeds pose a challenge for designing PCBN material. In certain applications, for example applications in which PCBN material is used to machine hardened steel in an intermediate interrupted mode (as characterised in the so-called "drilled 43/40"), there tends to be a degree of chemical as well as abrasive wear of the cBN comprised in the PCBN. The principal failure mode in such applications is chipping, which is believed to arise from the combination of chemical (crater) wear and impact associated with the interrupted nature of the work-piece.

As used herein, a material that "substantially consists of" certain constituents means that the material consists of the constituents apart from minor amounts of practically unavoidable impurities.

As used herein, the phrase metal silicide or metal boride, in which the metal may be specifically named, will generally refer to compounds containing one or more of the metal atoms and one or more of silicon or boron atom, respectively. For example, unless otherwise stated, a metal silicide phase may comprise the corresponding silicide and or di-silicide compound and or compounds containing three or more silicon atoms. In particular, titanium silicide will generally include TiSi and $TiSi_2$, and titanium boride will include $TiB_2$. However, specific compounds may be mentioned, and these will generally refer to stoichiometric, sub- and super-stoichiometric forms of the compound, unless otherwise stated.

The invention claimed is:

1. Composite material consisting of:
   at least 65 volume per cent cubic boron nitride grains dispersed in a binder matrix, the binder matrix comprising
   a plurality of microstructures bonded to the cubic boron nitride grains and
   a plurality of intermediate regions between the cubic boron nitride grains;
   the microstructures comprising titanium nitride; and
   the intermediate regions including a silicide phase containing titanium chemically bonded with silicon;
   in which
   the content of the silicide phase is 2 to 6 weight per cent of the composite material; and
   the cubic boron nitride grains have a mean size of 0.2 to 20 μm.

2. Composite material as claimed in claim 1, in which the microstructures further comprise titanium di-boride.

3. Composite material as claimed in claim 1, in which the silicide comprises a titanium silicide material having the chemical formula $Ti_xSi_y$, where x is 0.9 to 1.1 and y is 0.9 to 1.1.

4. Composite material as in claim 1, in which the silicide phase is spaced apart from the cubic boron nitride grains by the microstructures.

5. Composite material as claimed in claim 1, in which the microstructures are in the form of coating layers bonded to surface areas of the cubic boron nitride grains.

6. Composite material as claimed in claim 1, in which the content of the cubic boron nitride grains is at least 80 volume per cent of the composite material.

7. Composite material as claimed in claim 1, in which the cubic boron nitride grains have a mean size of 0.1 to 10 microns.

8. Composite material as claimed in claim 1, in which an area distribution of the cubic boron nitride grains as viewed on a surface of the composite material has at least two modes.

9. A method of using the composite material as claimed in claim 1, the method including:
   providing a machine tool comprising a cutting edge comprising the composite material;
   using the machine tool to machine a work-piece comprising ferrous material in interrupted mode, in which the work-piece is configured such that a continuous engagement length is 30 to 50 per cent of a distance traversed between the cutting edge and the surface of the work-piece during the machining operation.

10. The method as claimed in claim 9, in which the work-piece is configured such that at least a part of the work-piece presents an engagement angle to the cutting tool, the engagement angle being 30 to 90 degrees.

11. The method as claimed in claim 9 in which the work-piece comprises steel, cast iron or super-alloy material.

12. The method as claimed in claim 9, in which the work-piece is suitable for the manufacture of a brake disc, and the method includes machining the work-piece to make a brake disc.

13. A machine tool suitable for machining ferrous work-piece in interrupted mode, comprising composite material as claimed in claim 1, in which a cutting edge, a rake face and a flank face comprise the composite material.

\* \* \* \* \*